(No Model.) 2 Sheets—Sheet 1.
O. BIELMANN.
VACUUM EVAPORATING APPARATUS.
No. 386,958. Patented July 31, 1888.
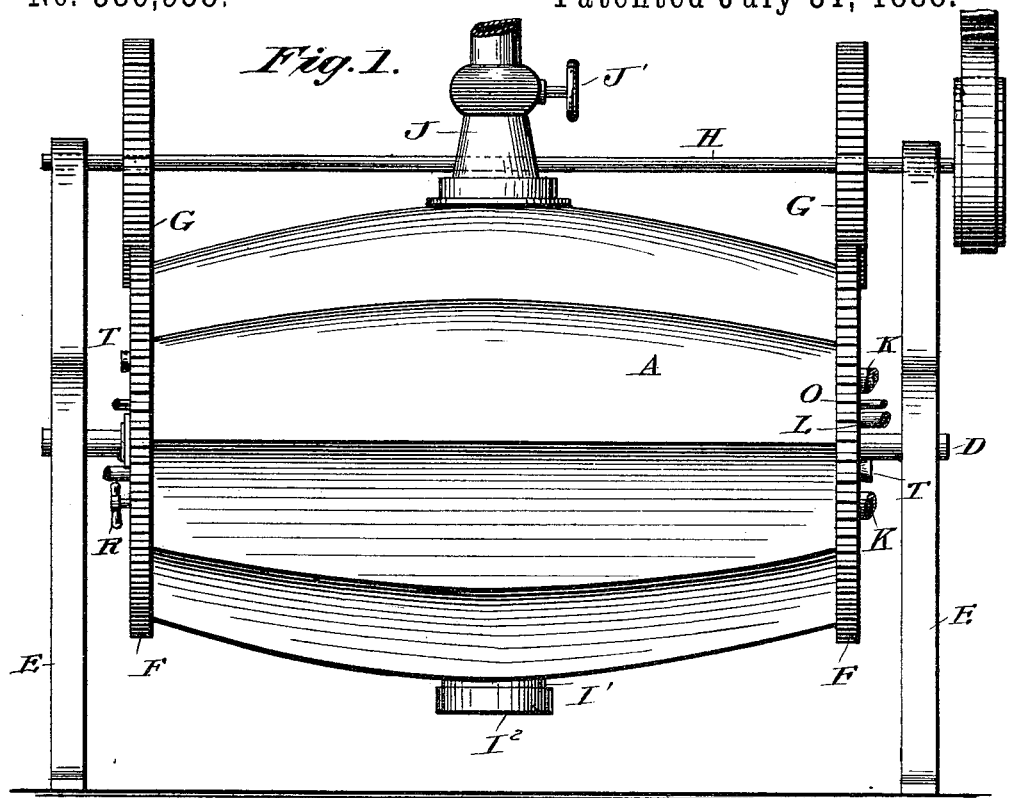
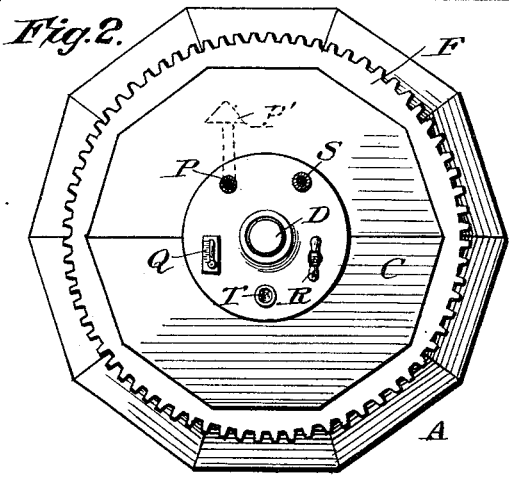
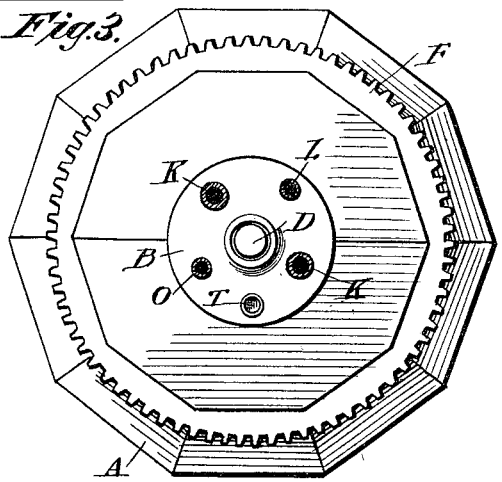
WITNESSES:
INVENTOR:
O. Bielmann
BY Munn & Co
ATTORNEYS.

(No Model.) 2 Sheets—Sheet 2.
O. BIELMANN.
VACUUM EVAPORATING APPARATUS.
No. 386,958. Patented July 31, 1888.
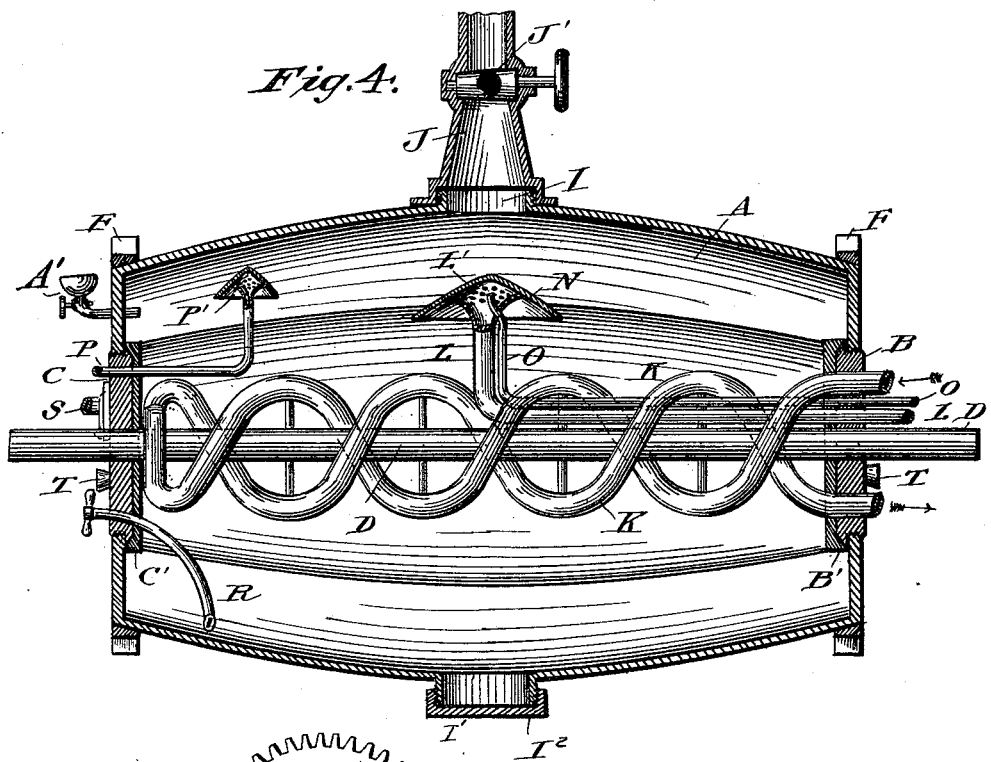
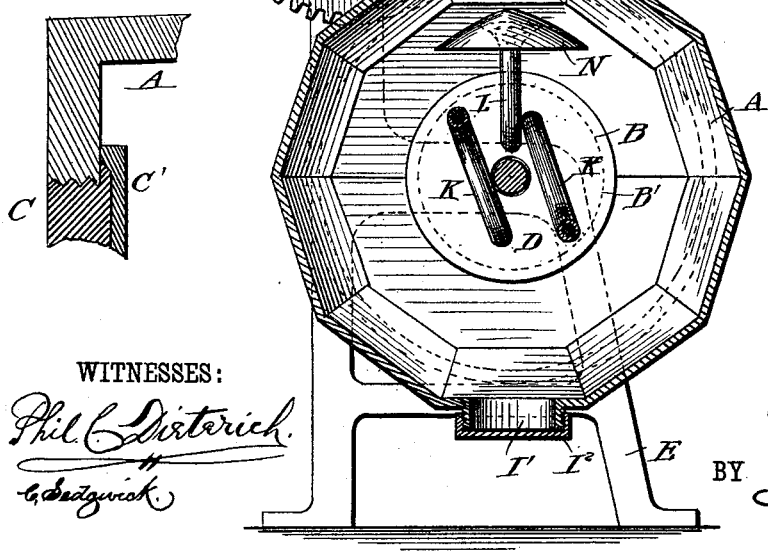
WITNESSES:
Phil C. Dieterich
G. Sedgwick
INVENTOR:
O. Bielmann
BY Munn & Co
ATTORNEYS.

UNITED STATES PATENT OFFICE.

OTTO BIELMANN, OF JERSEY CITY, NEW JERSEY.

VACUUM EVAPORATING APPARATUS.

SPECIFICATION forming part of Letters Patent No. 386,958, dated July 31, 1888.

Application filed September 30, 1887. Serial No. 251,125. (No model.)

*To all whom it may concern:*

Be it known that I, OTTO BIELMANN, of Jersey City, in the county of Hudson and State of New Jersey, have invented a new and Improved Vacuum Evaporating Apparatus, of which the following is a full, clear, and exact description.

The object of my invention is to provide a new and improved apparatus for crystallizing sugar from sugar-containing solutions.

The invention consists in an apparatus of special construction, hereinafter more fully described, and pointed out in the claims.

Reference is to be had to the accompanying drawings, forming a part of this specification, in which similar letters of reference indicate corresponding parts in all the figures.

Figure 1 is a side elevation of my apparatus. Figs. 2 and 3 are end elevations of the vacuum-pan. Fig. 4 is a longitudinal central sectional elevation of the apparatus. Fig. 5 is a vertical cross-section of the same, and Fig. 6 is a detail sectional view showing the joint between the head and end of the pan.

A vacuum-pan, A, of polygonal form in cross-section and having a shell tapering longitudinally from the middle to the ends, is mounted to rotate on fixed heads B and C, held on a shaft or spindle, D, supported by suitable standards, E.

In order to place the pan A on the heads B C, it is necessary to make it in two halves (see Figs. 2, 3, 5) fastened together.

Each fixed head B and C is preferably provided on its periphery with V-shaped annular rings, which fit into corresponding grooves formed on the ends of the pan A, whereby the latter is prevented from moving longitudinally. At the same time the V-shaped annular rings form a strong bearing for the pan. The V-shaped annular rings are lubricated when the pan and heads are fitted together and may also be lubricated when the pan is revolving in any desired manner.

Any suitable means may be employed to rotate the vacuum-pan A; but I prefer the construction shown in the drawings, in which the pan A is provided on the outside of each end with a gear-wheel, F, meshing into a gear-wheel, G, secured to a shaft, H, connected with driving mechanism for imparting a rotary motion to said shaft H, and consequently to the gear wheels F and G, and thus rotating the pan A.

The pan A is provided in the middle of its shell with inlet and outlet openings I and I', respectively, each being adapted to be closed by a cap, I²; or one of said openings can be connected with the supply-pipe J, having a valve, J', and fitting at its lower end in or over said opening, so as to enable the operator to introduce into the pan a certain quantity of crystallized sugar of a low grade.

The heads B and C are each provided on the inside with guards B' and C', respectively, which cover the joints between the rims of the heads and the ends of the pan A, as illustrated in Fig. 4, so as to prevent the sugar solution in the pan from passing into and clogging up the bearings.

A steam-coil, K, extends into the pan A and is supported partly by the shaft or spindle D and partly by the head B, through which the exit and entrance of said coil K takes place. The vacuum or air pipe L passes at one end through said fixed head B and into the interior of the pan A, extending to about its middle, and then bending upward at right angles, carrying at its upper end a cone-shaped hood, N, into the under side of which the pipe L opens through perforations L'. The cone-shaped hood N prevents the sugar from clogging up the inner end of the pipe L. The outer end of the vacuum or air pipe L is connected with a vacuum-producing apparatus of any approved construction, so as to produce in the pan A a vacuum of any desired degree. A small steam-pipe, O, also passes through the head B and exhausts into the upper end of the pipe L near the perforations L', and serves to loosen the formed sugar crystals remaining on the inner walls of the pan after the product is withdrawn.

On the head C is located a vacuum-meter, P, of any approved construction, and provided on its inner end with a hood, P', similar in construction to the hood N, only smaller, and serving for the same purpose. A thermometer, Q, is also located on the head C and connected with the inside of the pan A, so as to enable the operator to ascertain the temperature of the solution in the pan. A siphon, R, is held on the head C for examining at certain intervals the substance in the pan, in order to ascertain the progress of the crystallization of the sugar. In the head C is also located the inlet-pipe S for filling the pan with the sugar-containing solution, which must be neutralized before being treated. In each of heads C and B is formed a glass-covered peep-hole, T, for examining the interior of the pan A, and the latter is provided with an air-inlet valve, A', to overcome the vacuum in the pan A.

The operation is as follows: The openings I and I' in the pan A are closed by the screw-caps I², and the inlet-pipe J is moved out of the way until required, as hereinafter stated. The sugar-containing solution is introduced into the pan A by the inlet-pipe S, and then the pan is rotated by the means above described and is heated by the steam (preferably exhaust-steam) passing through the coil K. The vacuum apparatus connected with the pipe L is then set in motion, so as to produce a partial vacuum in the rotating pan, whereby the boiling down of the solution is facilitated in the usual manner. It will be seen that the peculiar form of the rotating pan A imparts a wave-like motion to the sugar-containing solution, whereby all the particles of the latter are constantly agitated by coming in contact with the sharp corners of the polygonally-shaped shell of the pan A, so that the crystals of sugar contained in the solution are formed rapidly by coming in strong contact with the surrounding solution. The latter, it will be noticed, does not come in contact with the coil K, and hence any burning of the solution is prevented. The pan is not heated above 40° Celsius, and as crystals are still forming at a temperature of 50° to 60° Celsius it is obvious that the apparatus will perform the work described. After the solution has been thus boiled down in the rotating vacuum-pan to a certain degree, as ascertained by the siphon R, the operator interrupts the rotary motion of the pan and removes the upper screw-cap, I², so as to bring the respective opening I or I' directly under the pipe J. About two to four per cent. of crystallized sugar of a low quality is now introduced through said pipe J into the interior of the pan A by opening the valve J'. After the introduction of this crystallized sugar, I remove the pipe J from the opening, which is again closed by its cap I². The pan A is then again rotated under vacuum for from about six to eight hours, so that said introduced crystallized sugar mixes thoroughly with the sugar-containing liquid. The crystals of sugar are now formed from this mixture very rapidly, and when all the sugar capable of being crystallized and contained in the solution is crystallized the process is ended in about the time above specified. The valve A' is then opened, so that air enters and overcomes the vacuum in the pan. The pan A is then opened by removing one of the screw-caps I², so that the product runs out, and is further treated in the usual manner.

With my improved apparatus I am enabled to work low-grade solutions which would not produce any crystallized sugar whatever in any other apparatus as heretofore constructed, and high-grade solutions produce at least eight to twelve per cent. more sugar than has heretofore been obtained.

It will be seen that with my apparatus I form the crystals of sugar very rapidly, and hence save considerable labor, time, and fuel in running the machine. The crystals are formed very rapidly by the wave-like motion imparted to the contents of the pan by the peculiar form of the latter and by the addition of crystallized sugar, as above described.

It is understood that by a richer quality of the solution the temperature in the pan can be increased and by a lower-grade solution the temperature must be reduced, but the time in which the pan is kept revolving is increased.

Having thus fully described my invention, I claim as new and desire to secure by Letters Patent—

1. In an apparatus for the manufacture of sugar, a rotary vacuum-pan having relatively stationary heads closing its ends and upon which it rotates, substantially as set forth.

2. In an apparatus for the manufacture of sugar, a rotary vacuum-pan having a tapering shell of polygonal form in cross-section, in combination with a steam-coil held in a fixed position in the middle of said pan, substantially as shown and described.

3. In an apparatus for the manufacture of sugar, the combination, with fixed heads supported on a shaft or spindle, of a vacuum-pan adapted to rotate on said heads, a steam-coil supported in the middle of said pan by said spindle and one of the heads, and a fixed vacuum-pipe extending through one of said heads into said pan, substantially as shown and described.

4. In an apparatus for the manufacture of sugar, the combination, with fixed heads supported on a shaft or spindle, of a vacuum-pan adapted to rotate on said heads, a steam-coil supported in the middle of the said pan by said spindle and one of the heads, a fixed vacuum-pipe extending through one of said heads into said pan, and a cone-shaped hood formed at the inner perforated end of said vacuum-pipe, substantially as shown and described.

5. In an apparatus for the manufacture of sugar, the combination, with fixed heads supported on a shaft or spindle, of a vacuum-pan adapted to rotate on said heads, a steam-coil supported in the middle of the said pan by said spindle and one of the heads, a fixed vacuum-pipe extending through one of said heads in the said pan, a cone-shaped hood formed at the inner perforated end of said vacuum-pipe, and a steam-pipe passing through one of said heads and exhausting under said hood in the perforated end of said vacuum-pipe, as set forth.

6. In an apparatus for the manufacture of sugar, a vacuum-pan provided with inlet and outlet openings in its shell, heads on which said pan rotates, a vacuum-pipe extending through one of said fixed heads into said pan, and a hood held on the inner perforated end of said vacuum-pipe directly in line with said openings in the shell of the pan, substantially as shown and described.

7. In an apparatus for the manufacture of sugar, the combination, with a rotating vacuum-pan, of fixed heads on which said pan rotates, and caps fitting over the inside joint of said heads and the ends of the pan, substantially as shown and described.

8. In an apparatus for the manufacture of sugar, the combination, with a vacuum-pan provided in its shell with inlet and outlet openings, of fixed heads on which said pan rotates, an inlet-pipe held in one of said heads for introducing the sugar solution, and an inlet-pipe provided with a valve and adapted to fit over one of the openings in the shell of the pan for introducing crystallized sugar, substantially as shown and described.

9. In an apparatus for the manufacture of sugar, a vacuum-pan formed of a longitudinally-divided shell and relatively-stationary heads closing the ends of the shell and forming bearings on which the pan rotates, substantially as set forth.

10. The combination, with a rotary vacuum-pan, of a vacuum-pipe extending into said pan and having perforations at its upper end, and a hood overhanging said perforations, substantially as set forth.

11. The combination, with a rotary vacuum-pan, of a vacuum-pipe entering the same and having perforations and an overhanging hood at its upper end, and a steam-pipe entering said pan and discharging under said hood, substantially as set forth.

OTTO BIELMANN.

Witnesses:
THEO. G. HOSTER,
C. SEDGWICK.